United States Patent
Wang et al.

(10) Patent No.: US 11,275,438 B2
(45) Date of Patent: Mar. 15, 2022

(54) FOCUS-BASED DEBUGGING AND INSPECTION FOR A DISPLAY SYSTEM

(71) Applicant: Apple Inc., Cupertino, CA (US)

(72) Inventors: Norman N. Wang, Saratoga, CA (US); Tyler L. Casella, San Jose, CA (US); Benjamin Breckin Loggins, Santa Clara, CA (US); Daniel M. Delwood, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/164,945

(22) Filed: Feb. 2, 2021

(65) Prior Publication Data

US 2021/0157405 A1  May 27, 2021

Related U.S. Application Data

(63) Continuation of application No. 16/452,675, filed on Jun. 26, 2019, now abandoned.

(60) Provisional application No. 62/692,929, filed on Jul. 2, 2018.

(51) Int. Cl.
*G06F 3/01* (2006.01)
(52) U.S. Cl.
CPC ................................. *G06F 3/013* (2013.01)
(58) Field of Classification Search
None
See application file for complete search history.

(56) References Cited

U.S. PATENT DOCUMENTS

| | | |
|---|---|---|
| 9,069,382 B1 | 6/2015 | Starner et al. |
| 10,380,803 B1 | 8/2019 | Jaafar et al. |
| 10,558,264 B1 | 2/2020 | Watson |
| 2009/0153549 A1 | 6/2009 | Lynch et al. |
| 2013/0194259 A1 | 8/2013 | Bennett et al. |
| 2013/0265220 A1 | 10/2013 | Fleischmann et al. |
| 2014/0028850 A1 | 1/2014 | Keating et al. |
| 2015/0213778 A1 | 7/2015 | Moravetz |
| 2017/0160798 A1 | 6/2017 | Lanman et al. |
| 2017/0302903 A1 | 10/2017 | Ng et al. |
| 2019/0033964 A1 | 1/2019 | Kulkarni et al. |

FOREIGN PATENT DOCUMENTS

| | | |
|---|---|---|
| CN | 102566049 A | 7/2012 |
| CN | 103472909 A | 12/2013 |
| CN | 104781853 A | 7/2015 |

(Continued)

OTHER PUBLICATIONS

Pai, Y. et. al., "GazeSim: Simulating Foveated Rendering Using Depth In Eye Gaze for VR", SIGGRAPH '16 Posters, Jul. 24-26, 2016, ACM 978-1-4503-4371—Aug. 16, 2007, (2 pp).

(Continued)

*Primary Examiner* — Nicholas J Lee
(74) *Attorney, Agent, or Firm* — Young Basile Hanlon & MacFarlane, P.C.

(57) ABSTRACT

A method includes determining an eye focus depth and determining a focus point relative to a viewing location in a virtual environment based on the eye focus depth, wherein the virtual environment includes a computer-generated object. The method also includes, upon determining that the focus point is located within a threshold distance from the computer-generated object, activating a function of a computer-executable code development interface relative to the computer-generated object.

26 Claims, 11 Drawing Sheets

(56) References Cited

FOREIGN PATENT DOCUMENTS

| CN | 106575153 A | 4/2017 |
|---|---|---|
| CN | 106575209 A | 4/2017 |
| CN | 107003521 A | 8/2017 |
| CN | 107810463 A | 3/2018 |
| CN | 107810634 A | 3/2018 |
| DE | 102013202219 A1 | 8/2014 |

OTHER PUBLICATIONS

Pai, Y., et. al., "Transparent Reality: Using Eye Gaze Focus Depth As Interaction Modality", UIST '16 Adjunct, Oct. 16-19, 2016, ACM 978-1-4503-4531—Jun. 16, 2010 (2 pp).

Padmanaban, N., et. al., "Optimizing Virtual Reality For All Users Through Gaze-Contingent And Adaptive Focus Displays", PNAS, Feb. 28, 2017, vol. 114, No. 9, 2183-2188, www.pnas.org/cgi/doi/10.1073/pnas.1617251114 (6 pp).

Konrad, R., et. al., "Depth Cues in VR Head Mounted Displays with Focus Tunable Lenses", Conference Proceedings, 2015 (6 pp).

Padmanaban., N., et. al., "Optimizing Virtual Reality For All Users Through Gaze-Contingent And Adaptive Focus Displays", PNAS Feb. 13, 2017, https://www.pnas.org/content/suppl/2017/02/08/1617251114.DCSupplemental (8 pp).

Youguang, Y., "Research On Visual Experience for 3D Mesh Model", Thesis submitted to Xidian University, Jun. 2017 (91 pp).

FOCUS-BASED DEBUGGING AND INSPECTION FOR A DISPLAY SYSTEM

CROSS-REFERENCE TO RELATED APPLICATION

This application is a continuation of U.S. patent application Ser. No. 16/452,675, filed on Jun. 26, 2019, which claims the benefit of U.S. Provisional Application No. 62/692,929, filed on Jul. 2, 2018, the content of which are incorporated herein by reference in their entireties for all purposes.

FIELD

The present disclosure relates generally to the field of display devices that are able to output content based on gaze direction.

BACKGROUND

Gaze-direction dependent displays are used in computer-generated reality systems, such as virtual reality systems, augmented reality systems, and mixed reality systems. As an example, head-mounted displays typically include optical assemblies that direct light from a display device, such as an LCD, LED, or OLED display panel, to the user's eyes. Head-mounted displays are operable to present content to the user and may incorporate head tracking and/or hand tracking capabilities. Head-mounted displays can be used to present content to the user, such as a three-dimensional computer-generated reality environment. Such environments can include numerous objects, each with its own properties, settings, features, and/or other characteristics.

SUMMARY

One aspect of the disclosure is a method for debugging. The method includes determining an eye focus depth for a user, determining a virtual focus point relative to a virtual view location in a virtual environment based on the eye focus depth for the user, wherein the virtual environment includes a first object and a second object, transitioning a first object from the virtual environment from a first rendering mode to a second rendering mode based on a location of the virtual focus point relative to the first object, wherein visibility of the second object from the virtual view location is occluded by the first object in the first rendering mode and visibility of the second object from the virtual view location is not occluded by the first object in the second rendering mode, and activating a function of a development interface relative to the second object while the first object is in the second rendering mode.

Another aspect of the disclosure is a method for debugging. The method includes determining an eye focus depth for a user and determining a virtual focus point relative to a virtual view location in a virtual environment based on the eye focus depth for the user. The virtual environment includes an object. The method also includes selecting the object in response to determining that the virtual focus point is located within a threshold distance from the object; and activating a function of a development interface relative to the object dependent upon selection of the object.

Another aspect of the disclosure is a method for debugging. The method includes determining an eye focus depth for a user and determining a virtual focus point relative to a virtual view location in a virtual environment based on the eye focus depth for the user. The virtual environment includes an object. The method also includes defining a visibility plane that passes through the virtual focus point. A first portion of the object is located on a first side of the visibility plane and is rendered using a first rendering mode in which the first portion of the object is fully visible, and a second portion of the object is located on a second side of the visibility plane and is rendered using a second rendering mode in which the second portion of the object is not fully visible. The method also includes activating a function of a development interface relative to the first portion of the object while the second portion of the object is in the second rendering mode.

DETAILED DESCRIPTION

The disclosure herein relates to interaction with virtual environments particularly in development interfaces. Virtual environments can include a large number of objects and other assets and can define complex visual and functional relationships. The systems and methods described herein allow for debugging and inspection of virtual environments within a development interface, including use of focus-based interaction mechanisms to enhance and facilitate viewing and selection of the objects and other features in a scene.

Figure 1:
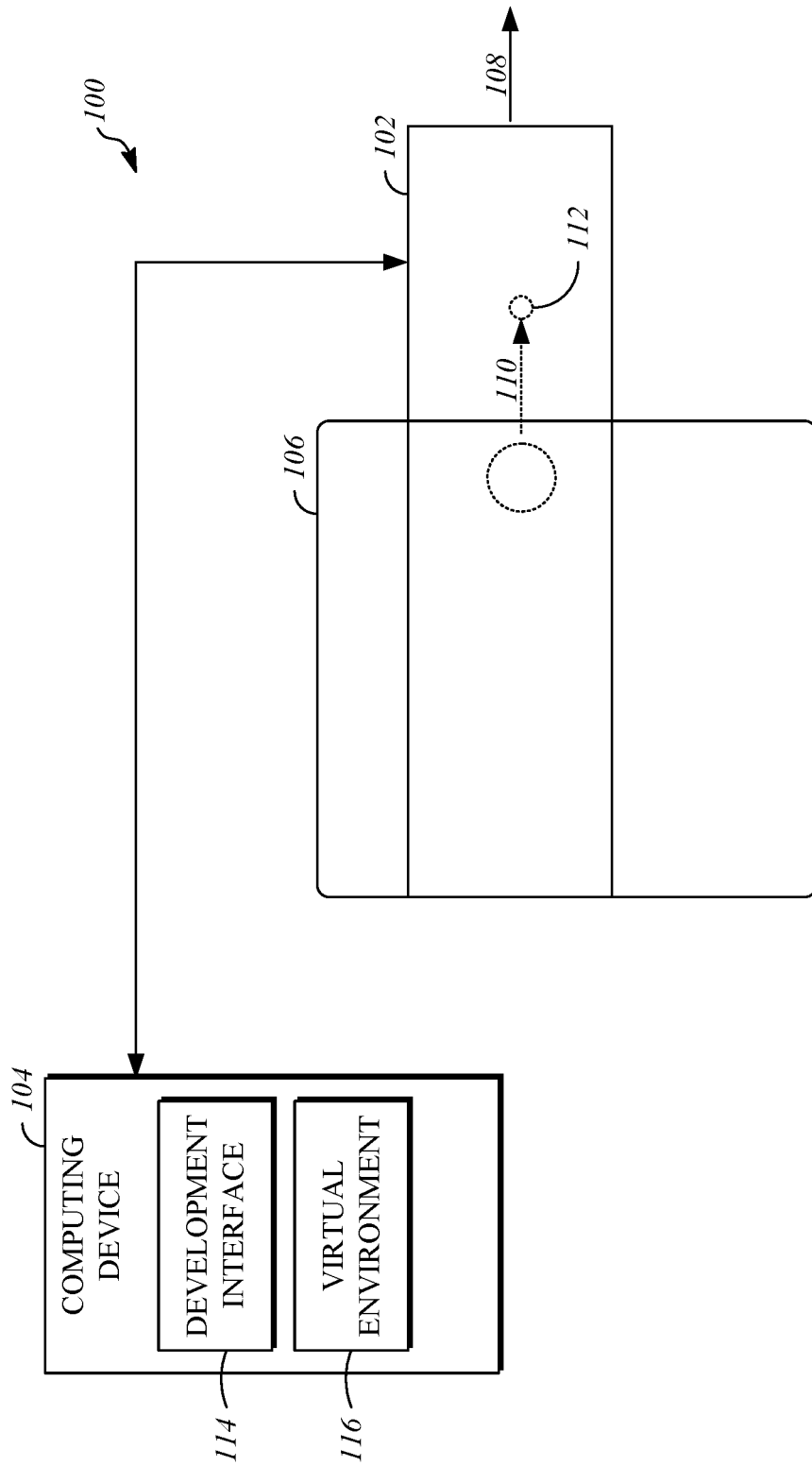
FIG. 1 is an illustration that shows a display system that includes a head-mounted display and a computing device.

FIG. 1 is a block diagram that shows a display system 100. In the example described herein, the display system 100 includes a head-mounted display 102 (herein, "HMD"), and a computing device 104. The HMD 102 is worn on the head of a user 106 and includes components that allow images to be shown to the user 106 as part of a computer-generated reality (herein, "CGR") experience. The images shown to the user 106 may be dependent on gaze direction and/or gaze depth, which can be measured by components associated with the HMD 102 as will be explained herein. The systems and methods described herein may also be implemented in the form of devices that are operable to display content in dependence on gaze direction and/or gaze depth but are not head mounted or worn by the user 106. The computing device 104 is connected to the HMD 102 by a wired or wireless connection, and is operable to compute, render, and or otherwise provide content to the HMD 102.

In the illustrated example, the computing device 104 is shown as separate from the HMD, and can be, for example, a stand-alone computer, such as a laptop computer or a desktop computer. It should be understood, however, that some or all of the functions that are described herein as being performed by computing device 104 could be performed by equivalent hardware that is incorporated in the HMD 102. Furthermore, in some implementations, some of the functions that are described in connection with HMD 102 and/or the computing device 104 could be performed by a mobile computing device, such as a smart phone, that is removably connected to (i.e., movable between a connected position and a disconnected position) the HMD 102. As an example, computing, image display, and/or sensing functions could be performed by a smart phone that is removably connected to an enclosure of the HMD 102.

In addition to causing display of content to the user 106, the HMD 102 also incorporates sensing functionality that can be used to control how the content that is displayed to the user 106. As will be explained herein, head tracking information 108, eye gaze angle 110, and eye focus depth 112 can be detected by sensors associated with the HMD 102 and used as control inputs. The head tracking information 108 represents the angular orientation and/or three-dimensional position of the HMD 102, which varies in correspondence with the angular orientation and location of the head of the user 106. The head tracking information 108 may be an angle expressed in three dimensions and/or may be expressed as a vector in three-dimensional space. The eye gaze angle 110 represents the direction along which the eyes of the user 106 are pointed and viewing a scene and represents rotation of the eyes of the user 106 relative to the head of the user 106. The eye gaze angle 110 may be an angle expressed in three dimensions and/or may be expressed as a vector in three-dimensional space. The eye focus depth 112 represent the distance from the eyes of the user 106 at which the user's eyes are attempting to focus and may be represented as a distance.

The computing device 104 is operable to execute software that provides various types of functionality to users. In the illustrated example, the computing device 104 provides functionality that corresponds to a development interface 114 and a virtual environment 116. The development interface 114 may be an integrated development environment (IDE) or another software tool that allows development of software applications, including defining scenes, objects, and parameters that define and/or are associated with the objects, and computer-executable code that is associated with the scenes and/or objects. The virtual environment 116 includes computer-executable program instructions and assets that define a three-dimensional scene that can be displayed and interacted with using the HMD 102 and associated input devices. Display and interaction with the virtual environment 116 are facilitated by the development interface 114, which allows the user to view, inspect, and modify aspects of the virtual environment and its constituent objects and assets. In the description herein, the development interface 114 and the virtual environment 116 are described as being implemented using software that is executed by the computing device 104. In an alternative implementation in which the HMD 102 is provided with on-board computing and rendering functionality, the software associated with the development interface 114 and the virtual environment 116 could be executed locally by the HMD 102, and the computing device 104 could be omitted or could be optional.

Figure 2:
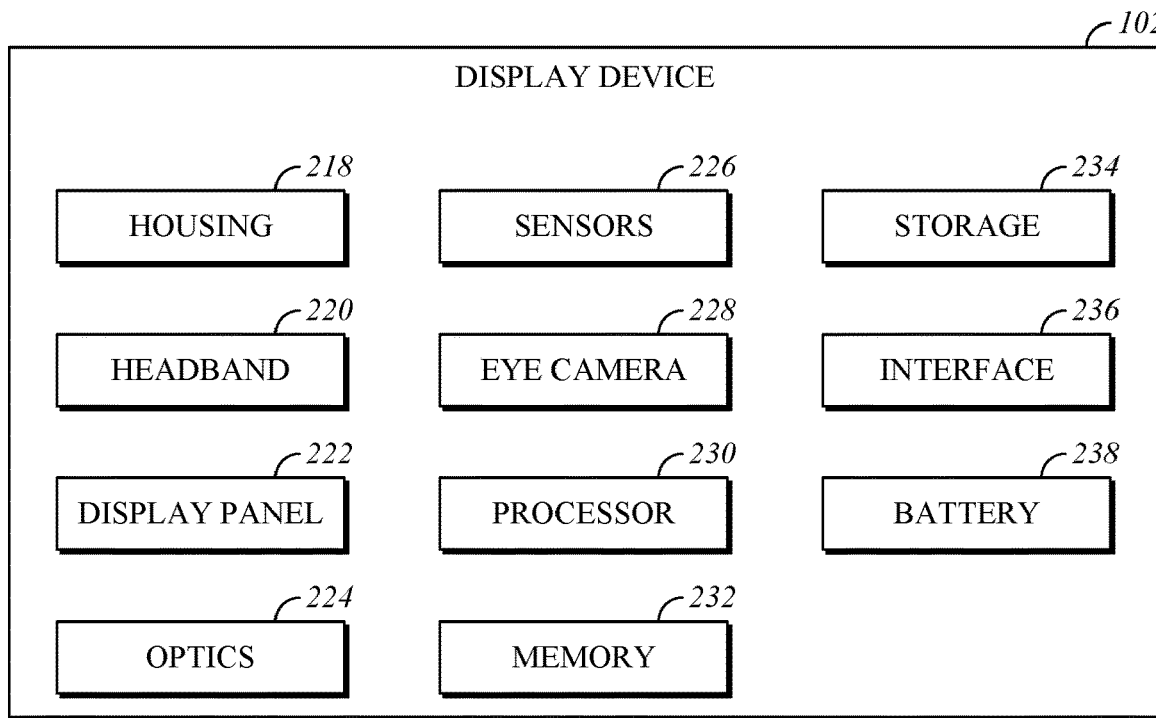
FIG. 2 is a block diagram that shows the head-mounted display.

FIG. 2 is a block diagram that shows the HMD 102. The HMD 102 may include a housing 218, a headband 220, a display panel 222, optics 224, sensors 226, an eye camera 228, a processor(s) 230, a memory 232, storage 234, a data connection 236, and a battery 238. As examples, the HMD 102 may be configured as any type of CGR system, such as a virtual reality system, a mixed reality system, an optical see-through augmented reality system, or a video see-through augmented reality system.

The housing 218 is the physical structure that other components of the HMD 102 are connected to and supported by. Various configurations and materials can be used for the housing 218. The housing 218 is connected to the headband 220, which supports the housing 218 with respect to the user's head. The headband 220 may be, as examples, a flexible strap, a rigid structure that extends around over part or all of the user's head, or a multi-part structure that includes components of varying types (e.g., flexible, rigid, elastic, etc.). Common configurations that can be utilized for the headband 220 include, as examples, a "goggles" type configuration, a "halo" type configuration, or a "mohawk" type configuration.

The display panel 222 is a device that is operable to output images, such as still images or video images. As examples, the display panel 222 may be an LCD display panel, an LED display panel, or an OLED display panel.

The optics 224 are configured to direct light that is emitted from the computing device 104 to the user's eyes and may also allow light from the external environment to reach the user's eyes. The optics 224, may include, as examples, lenses, reflectors, polarizers, waveguides, and/or other components. In one implementation, the optics 224 may include a lens that is positioned between the display panel 222 and the user's eyes. In another implementation the optics 224 may be configured as an optical combiner, such as an off-axis combiner, a polarized beam combiner, or a waveguide combiner.

The sensors 226 are devices that are incorporated in the HMD 102, such as by permanent connection to the housing 218 or the headband 220. The sensors 226 are able to output signals that represent a sensed condition. Examples of individual sensors that can be incorporated in the sensors 226 include an inertial measuring unit that utilizes accelerometers, gyroscopes, and magnetometers to output information that describes motion, visible spectrum cameras, infrared spectrum cameras, structured-light stereo devices, depth cameras, lidar devices, radar devices, ultrasonic devices, infrared detectors that measure signals from external infrared sources, infrared beacons that emit signals that can be measured by external infrared detectors, biometric sensors, capacitance sensors, temperature sensors, light sensors, and force sensors.

The eye camera 228 is a device that is operable to output images of the user's eyes, such as a visible spectrum video camera or an infrared spectrum video camera. The eye camera 228 may be located in the housing 218 of the HMD 102 and directed toward the user's eyes. The output from the eye camera 228 may be used to determine the eye gaze angle 110 and the eye focus depth 112 for the user 106. The eye gaze angle 110 and the eye focus depth 112 can be determined using known methods. As an example, the eye gaze angle 110 can be determined based on (e.g., as an average) of vectors constructed normal to the pupils of the eyes of the user 106. Identification, location, and angular orientation of the pupils can be determined using well-known machine vision techniques. The eye focus depth 112 may be determined based on the images obtained by the eye camera 228, for example, by determining a point of convergence for vectors constructed normal to the eyes of the user 106.

The processor(s) 230 is incorporated in the HMD 102, such as by location in the housing 218 of the HMD 102. The processor(s) 230 is operable to execute computer program instructions and perform operations described by the computer program instructions. As an example, the processor(s) 230 may be a conventional device such as a central processing unit.

The memory 232 may be a volatile, high-speed, short-term information storage device such as a random-access memory module. The storage 234 may be a non-volatile information storage device such as a flash memory module, a hard drive, or a solid-state drive.

The data connection 236 is communications connection that allows information to be exchanged between the HMD 102, the computing device 104, and/or other devices. The data connection 236 may be a wired connection or a wireless connection using any suitable communications protocol.

The battery 238 may be incorporated in implementations in which the HMD 102 is operated without a power-transmitting connection to an external computing device, such as the computing device 104, or to another power supply. For example, the HMD 102 may include the battery 238 in implementations that utilize wireless operation.

Figure 3:
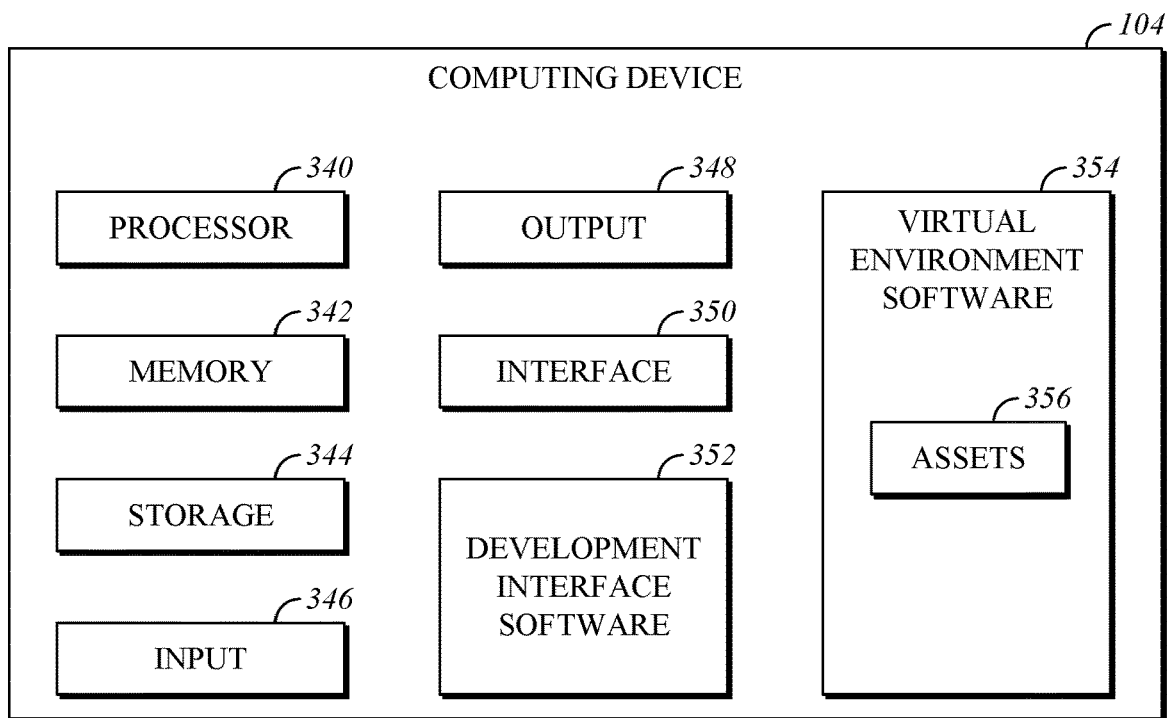
FIG. 3 is a block diagram that shows the computing device.

FIG. 3 is a block diagram that shows the computing device 104. The computing device 104 may include a processor 340, a memory 342, storage 344, one or more input devices 346, one or more output devices 348, a data connection 350, development interface software 352, and virtual environment software 354 that includes assets 356.

The processor 340 is operable to execute computer program instructions and perform operations described by the computer program instructions. As an example, the processor 340 may be a conventional device such as a central processing unit. The memory 342 may be a volatile, high-speed, short-term information storage device such as a random-access memory module. The storage 344 may be a non-volatile information storage device such as a flash memory module, a hard drive, or a solid-state drive. The input devices 346 may include, as examples, a keyboard, a touchscreen input device, a gestural input device, an audio input device (e.g., a microphone), a control stick, or a position-tracked controller. The output devices 348 may include, as examples, a display screen, a projected display, an audio output, or a haptic output. The data connection 350 is a wired or wireless communications connection that allows for communication with the HMD 102 using any type of protocol. For example, the computing device 104 may transfer pre-rendered content to the HMD 102 and receive information such as a sensor outputs from the HMD 102 using the data connection 350.

The development interface software 352 is executable by the computing device 104 and is operable to provide functionality that is associated with the development interface 114, which can be displayed and/or interacted with using the HMD 102 and/or the computing device 104 during execution of the development interface software 352. The virtual environment software 354 is executable by the computing device 104 and is operable to provide functionality that is associated with the virtual environment 116, which can be displayed and/or interacted with using the HMD 102 and/or the computing device 104 during execution of the virtual environment software 354. The assets 356 are associated with the virtual environment software 354 and include content that is displayed to the user through the virtual environment 116 and information that controls how the content is displayed and how the user can interact with the content. Examples of the assets 356 include three-dimensional models, animation sequences, materials, textures, shaders, lighting objects, virtual camera objects, colliders, physics controllers, particle systems, interactive objects, and scripts.

Figure 4:
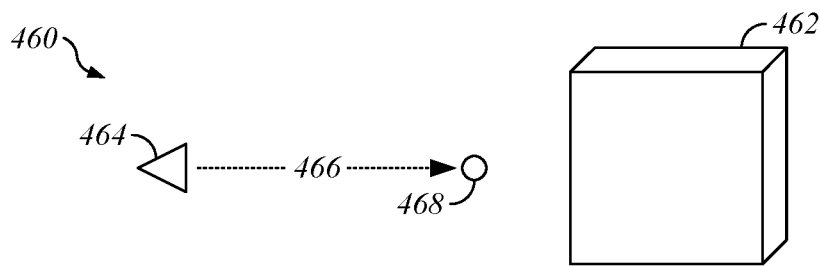
FIG. 4 is a perspective view illustration of a first scene showing an object in a first selection state.

FIG. 4 is a side-view illustration showing an example of a scene 460 that includes an object 462 in a first selection state. The scene 460 is a three-dimensional scene that is viewable by the user through the HMD 102. The scene 460 represents a portion of the virtual environment 116 and is rendered and displayed using the development interface 114, which allows a developer to debug the virtual environment 116, such as by reviewing, testing interactions with, and/or modifying the virtual environment 116. The object 462 is a virtual three-dimensional object that is present in the scene 460. The object 462 may be fixed or movable within the scene 460.

A virtual view position 464 (e.g., a virtual camera) is positioned relative to the scene 460 and represents the virtual location of the user's eyes for purposes of rendering content that will be displayed to the user 106 through the HMD 102. The location of the virtual view position 464 relative to the scene 460 may be controlled by the tracking the HMD 102 and the eyes of the user 106, for example, using the head tracking information 108.

A virtual gaze ray 466 is defined relative to the virtual view position 464. The virtual gaze ray 466 can be defined as a vector in three-dimensional space relative to the scene 460 using the head tracking information and the eye gaze angle 110 to determine, relative to the scene, the view direction that corresponds the head angle and gaze direction of the user 106. A virtual focus point 468 is defined along the virtual gaze ray 466. The virtual focus point 468 is an estimated location represents the point in the scene that the eyes of the user 106 are attempting to focus on. The distance, in virtual space, of the virtual focus point 468 from the virtual view position 464 (which may also be referred to as virtual eye focus depth), is determined based on the eye focus depth 112. As previously described, the eye focus depth 112 can be determined using images obtained from the eye camera 228. As one example, the distance of the virtual focus point 468 from the virtual view position 464 can be determined by applying a scaling factor to the eye focus depth 112.

In FIG. 4, the first selection state corresponds to an absence of selection of any object based on the virtual focus point 468. In particular, the virtual gaze ray 466 is oriented toward the object 462, and the virtual focus point 468 is located between the virtual view position 464 and the object 462. In some implementations, presence or absence of a selection of the object 462 is determined based on presence of the virtual focus point 468 within a predetermined distance of the object 462, and in FIG. 4, the virtual focus point 468 is at a position that is greater than the threshold distance from the object 462. Accordingly, the object 462 is unselected in the first selection state.

Figure 5:
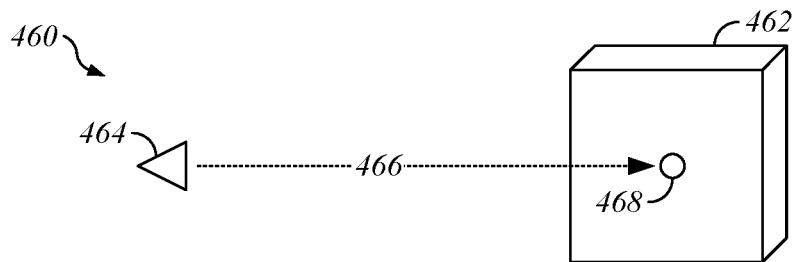
FIG. 5 is a perspective view illustration of a scene showing the object in a second selection state.

FIG. 5 is a side-view illustration showing the scene 460 that includes with the object 462 in a second selection state. The virtual focus point 468 has moved relative to the position depicted in FIG. 4, in response to a change in the eye focus depth 112, as measured by the eye camera 228, or as measured otherwise.

The second selection state corresponds to selection of the object 462. In the illustrated example, the virtual focus point 468 is inside of the object 462, and the second selection state can be activated in response to the virtual focus point 468 being inside of the object 462. As another example, the second selection state can be activated in response to the virtual focus point being within a predetermined distance from the object 462, and this distance may be measured relative to a predetermined point relative to the object 462, a center point of the object 462, surfaces of the object 462, and/or a bounded area (e.g., a bounding rectangle, sphere, capsule, etc.) that is defined relative to the object 462.

While the second selection state is active, actions can be performed relative to the object 462, such as modifying the object 462 and/or properties associated with the object 462. As one example, activation of the second selection state can pause code execution that is associated with the object 462 (e.g., a script attached to the object 462) while code execution continues for other portions of the scene 460, such as other objects that are included in the scene 460. Pausing code execution can include triggering a break point that is included in the code that is associated with the object 462. Put another way, the gaze information is used to trigger a breakpoint in the execution of code associated with object 462. As another example activation of the second selection state can allow modification of one or more properties of the object 462 using an input device. One example of modifying properties using an input device includes changing a value associated with a property by a button press or using a control stick (e.g., a thumb stick that is included as part of a hand-held input device. If the object 462 is a viewable object that has a color, the color could be modified using a button press or using a control stick. If the object 462 is a lighting object, an intensity of light emitted by the lighting object could be modified using a button press or using a control stick. These are examples only, and other types of properties can be modified in a similar manner using the same or different input modalities.

Figure 6:
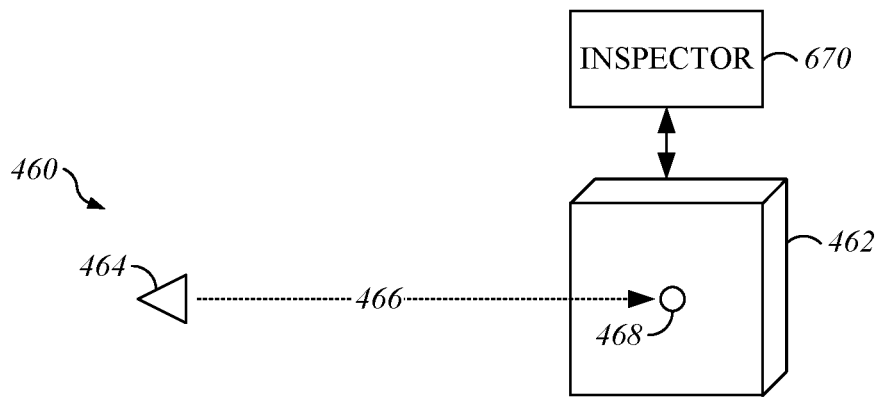
FIG. 6 is a perspective view illustration of a scene showing the object in a third selection state.

FIG. 6 is a side-view illustration showing the scene 460 that includes with the object 462 in a third selection state. The virtual focus point 468 has moved relative to the position depicted in FIG. 4, in response to a change in the eye focus depth 112, as measured by the eye camera 228, or as measured otherwise. As explained relative to FIG. 6, in one implementation, the third selection state can be activated by the virtual focus point 468 being within the object 462 or within a predetermined distance from the object 462. In another implementation, the third selection state can be activated by the virtual focus point 468 being within the object 462 or within a predetermined distance from the object 462 for greater than a threshold time period.

The third selection state corresponds to display of additional information that is associated with the object 462. The additional information can be displayed by a user interface element that is part of the scene 460, by a user interface element that added to the scene 460 in response to activation of the third election state, or by a user interface element that is part of a heads-up-display that is presented to the user 106 as an overlay relative to the scene 460. In the illustrated example, the third selection state includes display of an inspector 670 as part of the scene 460. The inspector 670 can be, for example, a two-dimensional user interface that is displayed within the scene 460 (e.g., by projecting the user interface on a plane). The inspector 670 can, as examples, display values that correspond to properties of the object 462, and/or allow modification of values that correspond to properties of the object 462.

Figure 7:
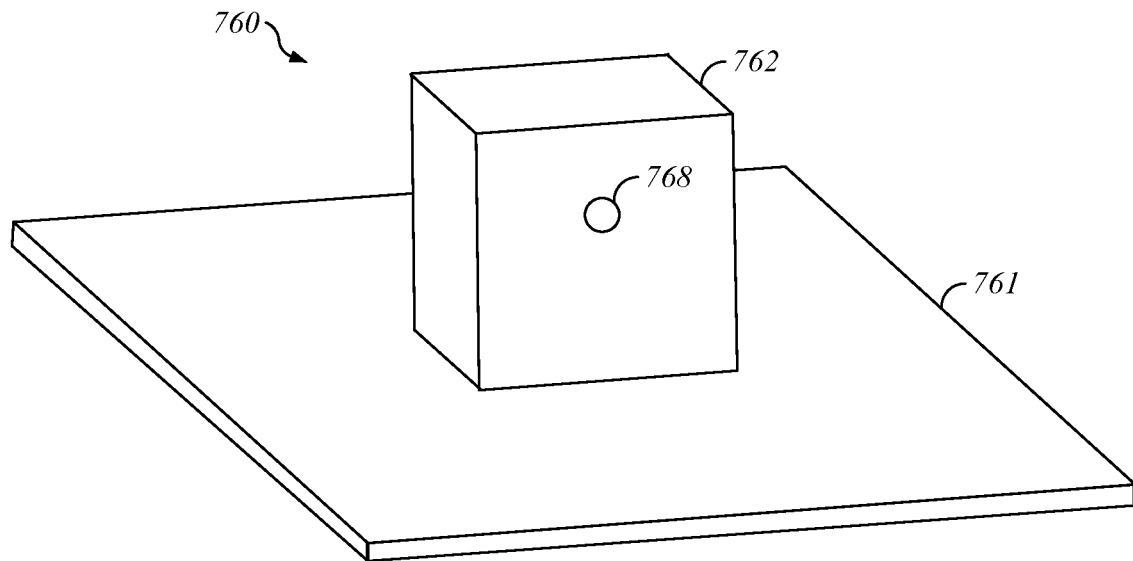
FIG. 7 is a perspective view illustration of a scene showing a first object in a first rendering mode.

FIG. 7 is a perspective view illustration of a scene 760 showing a first object 762 in a first rendering mode. The scene 760 is depicted from a virtual view position and oriented along a virtual gaze ray (not shown in FIG. 7). In the illustrated example, the first object 762 is a virtual three-dimensional object which is rendered and output for display as part of the scene 760. The scene 760 may also include a ground plane 761, which may be a virtual object or may be a physical ground plane in implementations where the HMD 102 is configured as an augmented reality system or a mixed reality system. A virtual focus point 768, which is configured according to the description of the virtual focus point 468, is positioned either between the virtual view position and the first object 762 (i.e., on a "near side" or "first side" of the first object 762) or within the first object 762. In the first rendering mode, a nominal rendering mode may be applied, which shows the first object 762 in the scene in the manner in which it is intended to appear in the virtual environment 116 when viewed in final form, outside of the context of the development interface 114. As an example, the first object 762 may be rendered according to colors, materials, textures, and/or shaders associated with the first object 762.

Figure 8:
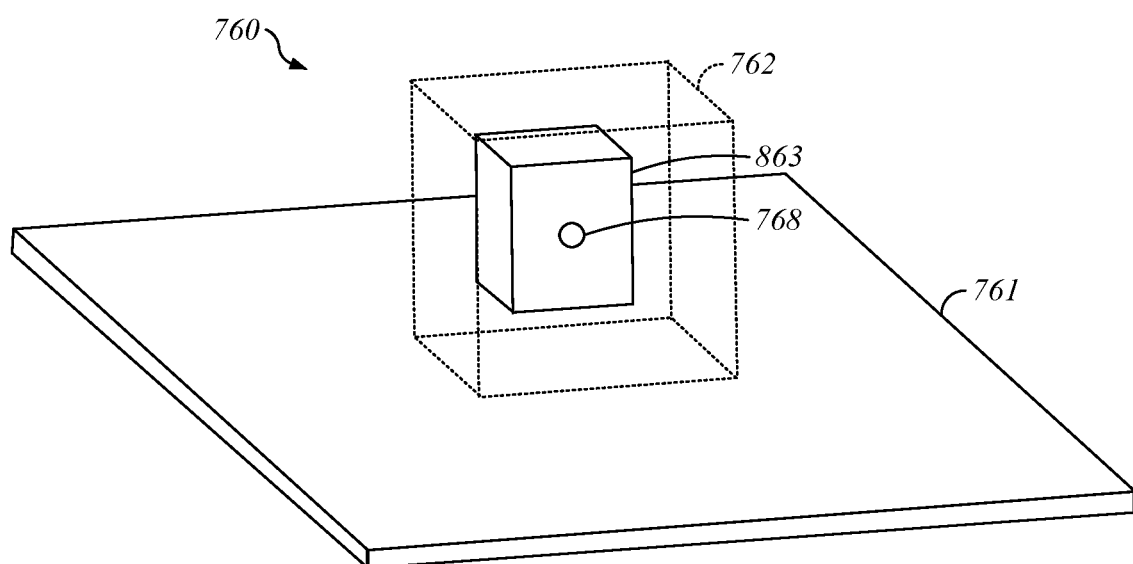
FIG. 8 is a perspective view illustration of the scene showing the first object in a second rendering mode in which a second object is visible.

FIG. 8 is a perspective view illustration of the scene 760 showing the first object 762 in a second rendering mode and a second object 863. The second rendering mode is activated in response to the virtual focus point 768 having moved past the first object 762 (i.e., to a "far side" or "second side" of the first object 762). A return to the first rendering mode can occur if this is no longer the case.

The first rendering mode is a rendering mode that causes the first object 762 to block visibility of the second object 863, and the second rendering mode is a rending state in which the first object does not block visibility of the second object 863, under circumstances that a virtual gaze ray associated with a current view of the scene 760 passes through the first object 762.

In the second rendering mode, the rendering settings for the first object 762 have changed in response to the changed position of the virtual focus point 768. The second rendering mode modifies the rendering settings for the first object 762 relative to the first rendering mode. Transition from the first rendering mode to the second rendering mode can include transition from rendering according to colors, materials, textures, and/or shaders associated with the first object 762, to rendering according to settings that are associated with the second rendering mode and which are configured to allow visibility of objects that are partially or fully occluded by the first object 762 when the first object 762 is in the first rendering mode. Thus, as in the illustrated example, the second object 863 is occluded when the first object 762 is in the first rendering mode (FIG. 7) and the second object 863 is visible when the first object 762 is in the second rendering mode, in which the first object 762 is rendered in a wireframe rendering mode. While in the second rendering mode, operations can be performed relative to the second object 863 using functionality associated with the development interface 114, such as, for example, inspecting properties for the second object 863, modifying properties for the second object 863, and/or pausing code execution for the second object 863.

The second rendering mode modifies the visibility of the first object 762 relative to the first rendering mode. As one example, the first object 762 can transition from visible in the first rendering mode to invisible in the second rendering mode. As another example, the first object 762 can transition from opaque in the first rendering mode to transparent in the second rendering mode. As another example, the first object 762 can transition from nominal rendering according to colors, materials, textures, and/or shaders that are associated with the first object 762, to rendering according to a wireframe rendering mode.

Figure 9:
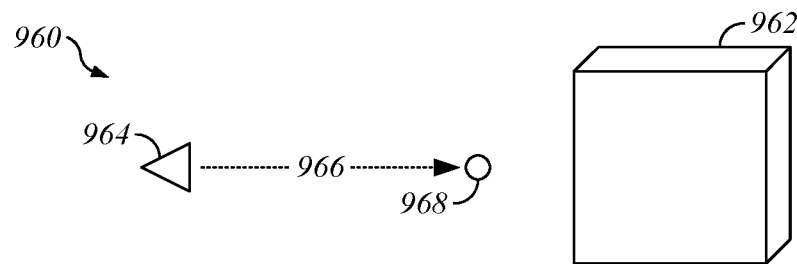
FIG. 9 is a side view illustration of a scene showing an object in a fully visible rendering mode.

FIG. 9 is a side view illustration of a scene 960 showing an object 962 in a fully visible rendering mode. A virtual gaze ray 966 extends from a virtual view position 964 and is oriented toward the object 962, and a virtual focus point 968 is located between the virtual view position 964 and the object 962. The object 962, the virtual view position 964, the virtual gaze ray 966, and the virtual focus point 968 are configured in the manner previously described with respect to the object 462, the virtual view position 464, the virtual gaze ray 466, and the virtual focus point 468. In the fully visible rendering mode, the object 962 is fully visible and rendered according to nominal rendering settings using properties that are associated with the object 962.

Figure 10:
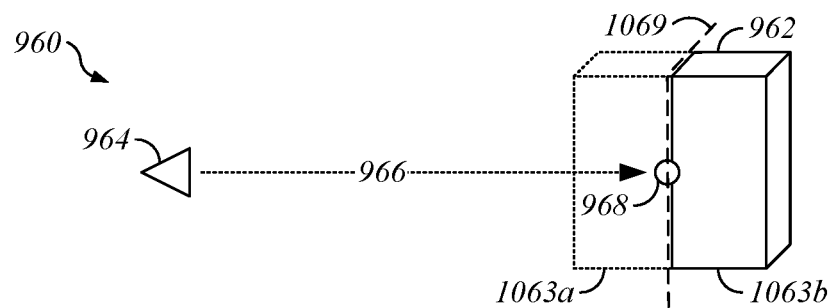
FIG. 10 is a side view illustration of the scene showing the object in a partially visible rendering mode.

FIG. 10 is a side view illustration of the scene 960 showing the object 962 in a partially visible rendering mode. In the partially visible rendering mode, the virtual focus point 968 is positioned within the object 962, and a visibility plane 1069 is defined at the virtual focus point 968. A first portion 1063*a* of the object 962 that is located between the virtual view position 964 and the visibility plane 1069 is either hidden from view (i.e., not visible in the scene 960 from the perspective of the user 106 or is rendered such that objects are visible through it, such as by translucent rendering or by wireframe rendering. A second portion 1063*b* of the object 962 that is located on a far side of the visibility plane 1069 relative to the virtual view position 964 is rendered normally and is visible in the scene 960 from the perspective of the user 106. Thus, the partially visible rendering mode allows viewing of internal portions, if present, of the object 962. By updating the location of the visibility plane 1069 as the location of the virtual focus point 968 changes, a cutaway view of the object 962 that adapts to the eye focus depth 112 of the user 106 is defined, allowing the user to control inspection of the internal portions of the object 962 in real time.

The visibility plane 1069 may be generated having a desired orientation with respect to the scene 960. As one example, the visibility plane 1069 may be generated in a desired orientation relative to the visibility plane, such as by orienting the visibility plane perpendicular to the virtual gaze ray 966. As another example, the visibility plane 1069 may be generated in a desired orientation relative to the world space of the scene 960, such as by orienting the visibility plane 1069 perpendicular to one of the X, Y, or Z axes of the world space of the scene 960. As another example, the visibility plane 1069 may be generated in a desired orientation relative to the local coordinate space of the object 962, such as by orienting the visibility plane 1069 perpendicular to one of the X, Y, or Z axes of the local coordinate space of the object 962.

While in the partial visibility state, the user 106 can access functionality associated with the development interface 114 to interact with and modify objects or portions of objects (e.g., internal surfaces of the object 962) that would otherwise be unviewable from the virtual view position 964, such as, for example, inspecting properties for the object 962, modifying properties for the object 962, and/or pausing code execution for the object 962.

Figure 11:
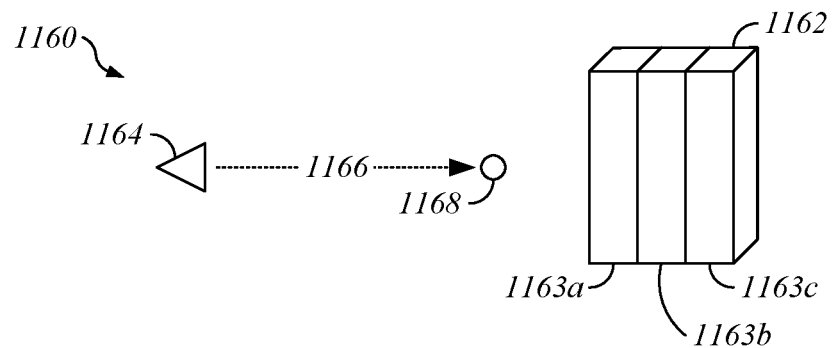
FIG. 11 is a side view illustration showing a layered object in which all of the layers are visible.

FIG. 11 is a side view illustration of a scene 1160 showing a layered object 1162 in which all of multiple layers, such as first through third layers 1163*a*, 1163*b*, and 1163*c* of the layered object are visible. As an example, the layered object 1162 could be a user interface that includes layered two-dimensional portions and is displayed in three-dimensional space as part of the scene 1160.

A virtual gaze ray 1166 extends from a virtual view position 1164 and is oriented toward the layered object 1162, and a virtual focus point 1168 is located between the virtual view position 1164 and the layered object 1162. The layered object 1162, the virtual view position 1164, the virtual gaze ray 1166, and the virtual focus point 1168 are configured in the manner previously described with respect to the object 462, the virtual view position 464, the virtual gaze ray 466, and the virtual focus point 468. In the illustrated example shown in FIG. 111, all of the layers of the layered object 1162 are fully visible and rendered according to nominal rendering settings using properties that are associated with the layered object 1162.

Figure 12:
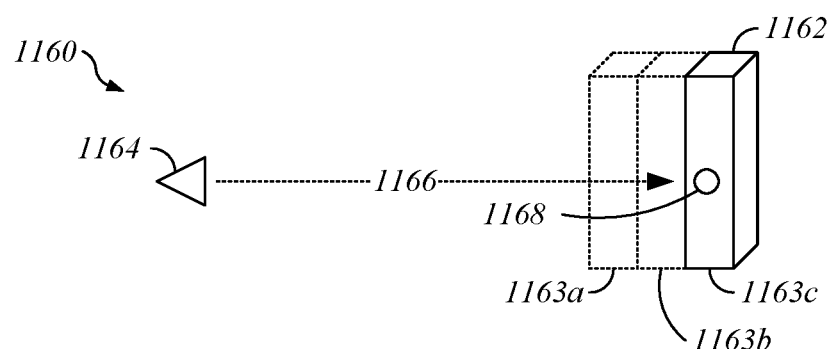
FIG. 12 is a side view illustration showing the layered object in which some of the layers are not visible.

FIG. 12 is a side view illustration showing the layered object 1162, in which some of the layers are not visible. In particular, the first and second layers 1163*a*, 1163*b* have been transitioned from the visible state, as in FIG. 11, to a non-visible state, in which the layers are not displayed, or are displayed using a translucent or wireframe rendering mode that allows the third layered to be viewed without occlusion by the first and second layers 1163*a*, 1163*b*. The first and second layers 1163*a*, 1163*b* have been transitioned to non-visible states in response to the virtual focus point 1168 moving past them (i.e. to a far side of the first and second layers 1163*a*, 1163*b* relative to the virtual view position 1164). As an alternative to transitioning to non-visible states, the first and second layers 1163*a*, 1163*b* could be moved so that they no longer occlude visibility of the third layer 1163*c*.

While the third layer 1163*c* is no longer occluded by the first layer 1163*a* and the second layer 1163*b*, the user 106 can access functionality associated with the development interface 114 to interact with and modify the third layer 1163*c*, such as, for example, inspecting properties for the third layer 1163*c*, modifying properties for the third layer 1163*c*, and/or pausing code execution for the third layer 1163*c*.

Figure 13:
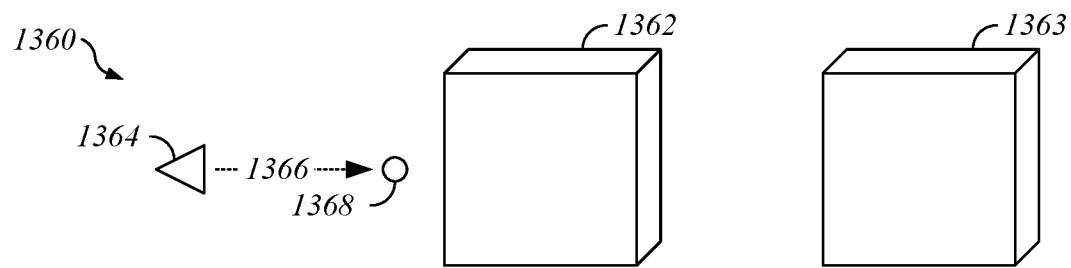
FIG. 13 is a side view illustration of a scene showing a first object and a second object with the first object in a fully visible rendering mode.

FIG. 13 is a side view illustration of a scene 1360 showing a first object 1362 and a second object. The scene 1360 is a CGR scene that includes virtual objects and physical objects. In the scene 1360, the first object 1362 is a virtual object that is presented in a fully visible rendering mode. The second object 1363 is a physical object that is part of the environment around the user 106. A virtual gaze ray 1366 extends from a virtual view position 1364 and is oriented toward the first object 1362, and a virtual focus point 1368 is located between the virtual view position 1364 and the first object 1362. The first object 1362, the virtual view position 1364, the virtual gaze ray 1366, and the virtual focus point 1368 are configured in the manner previously described with respect to the object 462, the virtual view position 464, the virtual gaze ray 466, and the virtual focus point 468. In the fully visible rendering mode, the first object 1362 is fully visible and rendered according to nominal rendering settings using properties that are associated with the first object 1362.

Figure 14:
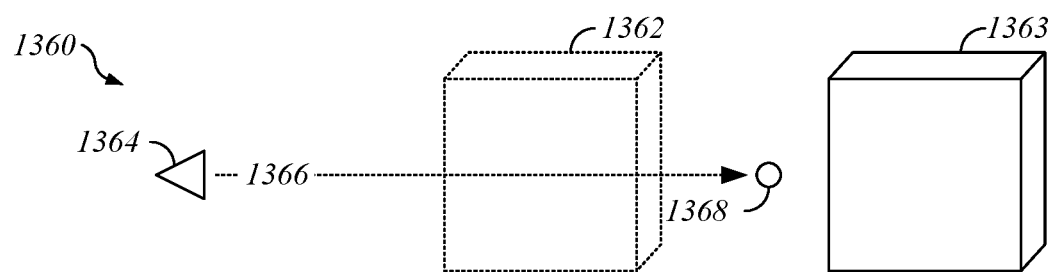
FIG. 14 is a side view illustration of a scene showing the first object and the second object with the first object in a modified visibility rendering mode.

FIG. 14 is a side view illustration of the scene 1360 showing the first object 1362 in a modified visibility rendering mode, in which the first object is transparent, translucent, rendered in wireframe, or otherwise does not occlude visibility of the second object 1363. In the partially visible rendering mode, the virtual focus point 1368 is positioned on a far side of the first object 1362 relative to the virtual view position 1364. Thus, the modified visibility rendering mode allows viewing of the second object 1363 in response to the virtual focus point moving past the first object 1362.

While the second object 1363 is no longer occluded by the first object 1362, the user 106 can access functionality associated with the development interface 114 to inspect the second object 1363, such as, for example, inspecting properties, measured values, and or interpreted information (e.g., an estimated surface geometry and/or position) for the second object 1363.

Figure 15:
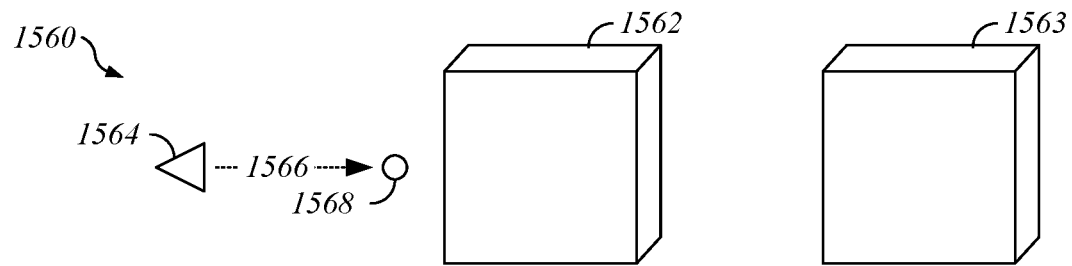
FIG. 15 is a side view illustration of a scene showing a first object and a second object.

FIG. 15 is a side view illustration of a scene 1560 showing a first object 1562 and a second object 1563. The scene 1560 is a CGR scene that includes physical objects and virtual objects. The in the scene 1560, the first object 1562 is a physical object that is part of the environment around the user 106. The second object 1563 is a virtual object that is positioned relative to the first object 1562 such that it does not appear as visible within the scene 1560 from a virtual view position 1564, and therefore is not output for display using the HMD 102 due to occlusion by the first object 1562. A virtual gaze ray 1566 extends from the virtual view position 1564 and is oriented toward the first object 1562, and a virtual focus point 1568 is located between the virtual view position 1564 and the first object 1562. The first object 1562, the virtual view position 1564, the virtual gaze ray 1566, and the virtual focus point 1568 are configured in the manner previously described with respect to the object 462, the virtual view position 464, the virtual gaze ray 466, and the virtual focus point 468.

Figure 16:
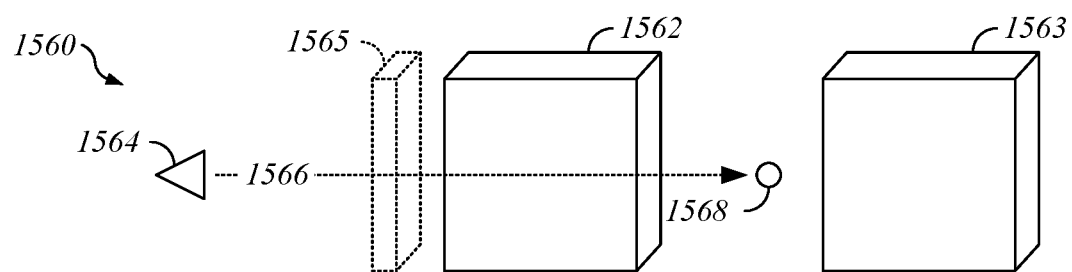
FIG. 16 is a side view illustration of a scene showing the first object, the second object, and an indicator regarding a position of the second object within the scene.

FIG. 16 is a side view illustration of the scene 1560 showing the first object 1562, the second object 1563, and an indicator 1565 regarding a position of the second object within the scene 1560. For example, the indicator 1565 can be an opaque, translucent, or wireframe representation of the second object 1563 or a graphical symbol representative of the second object 1563. The virtual focus point 1568 is positioned on a far side of the first object 1562 relative to the virtual view position 1564. In response to the position of the virtual focus point 1568 moving past the first object 1562 in the scene 1560, the indicator 1565 is output in the scene 1560 such that is appears to be between the virtual view position 1564 and the first object 1562 such that the indicator 1565 is operable to indicate, to the user 106, that the second object 1563 is located behind and is occluded by the first object 1562.

While the indicator 1565 is displayed, the user 106 can interact with the indicator 1565 to access functionality associated with the development interface 114 to inspect and/or modify the second object 1563, such as by viewing and or modifying properties that are associated with the second object 1563.

Figure 17:
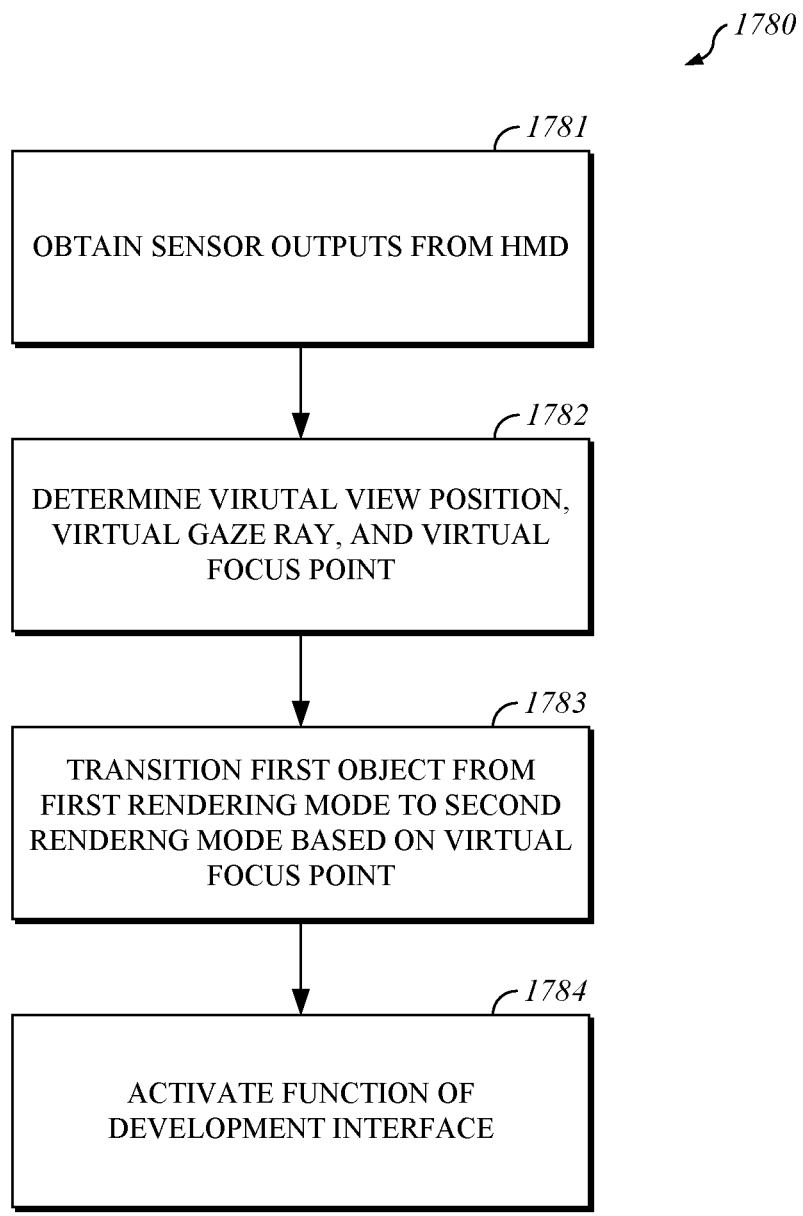
FIG. 17 is a flowchart that shows a process for focus-based debugging and inspection for a head-mounted display system according to a first example.

FIG. 17 is a flowchart that shows a process 1780 for focus-based debugging and inspection for a display system 100. The process 1780 may be performed, for example, using the HMD 102 and the computing device 104. Portions of the process 1780 can be implemented as computer program instructions that are executed by a computing device, such as the processor 340 of the computing device 104.

In operation 1781, sensor outputs are obtained from a head-mounted display, such as the HMD 102. The sensor outputs can include or can be interpreted to determine the head tracking information 108, the eye gaze angle 110, and the eye focus depth 112. In operation 1782, a virtual view position, a virtual gaze ray, and a virtual focus point are determined, as described with respect to the virtual view position 464, the virtual gaze ray 466, and the virtual focus point 468. The virtual view position, the virtual gaze ray, and the virtual focus point are located within a scene in a virtual environment, as described with respect to the virtual environment 116, the scene 460, the scene 760, the scene 960, the scene 1160, the scene 1360, and the scene 1560.

The eye focus depth may be determined using output from a sensor that is associated with a head-mounted display, such as the eye camera 228 of the HMD 102. The virtual gaze ray may be determined based on an eye gaze angle 110 and head tracking information 108 from the HMD 102. The virtual focus point may be located along the virtual gaze ray.

In operation 1783, a first object that is located in the virtual environment is transitioned from a first rendering mode to a second rendering mode based on a location of the virtual focus point relative to the first object. As an example, the first object may be located along the virtual gaze ray. Transitioning between the first rendering mode and the second rendering mode can be performed in the manner described with respect to the scene 760 and FIGS. 7-8. For example, visibility of the second object from the virtual view location can be occluded by the first object in the first rendering mode and visibility of the second object from the virtual view location can be free from occlusion by the first object in the second rendering mode.

In some implementations, transitioning the first object from the first rendering mode to the second rendering mode in performed in response to determining that the virtual focus point is located on a far side of the first object relative to the virtual view location. The first rendering mode may utilize rendering settings that are associated with the first object. In some implementations of the second rendering mode, the first object is not visible in the second rendering mode. In some implementations of the second rendering mode, the first object is translucent in the second rendering mode. In some implementations of the second rendering mode, the first object is rendered as a wireframe in the second rendering mode.

In operation 1784, a function of a development interface is activated relative to the second object while the first object is in the second rendering mode, as described with respect to, for example, the development interface 114 and the inspector 670.

In some implementations, activating the function of the development interface causes display of information associated with the second object. In some implementations, activating the function of the development interface causes modification of information associated with the second object. In some implementations, activating the function of the development interface causes a pause of code execution that is associated with the second object.

Figure 18:
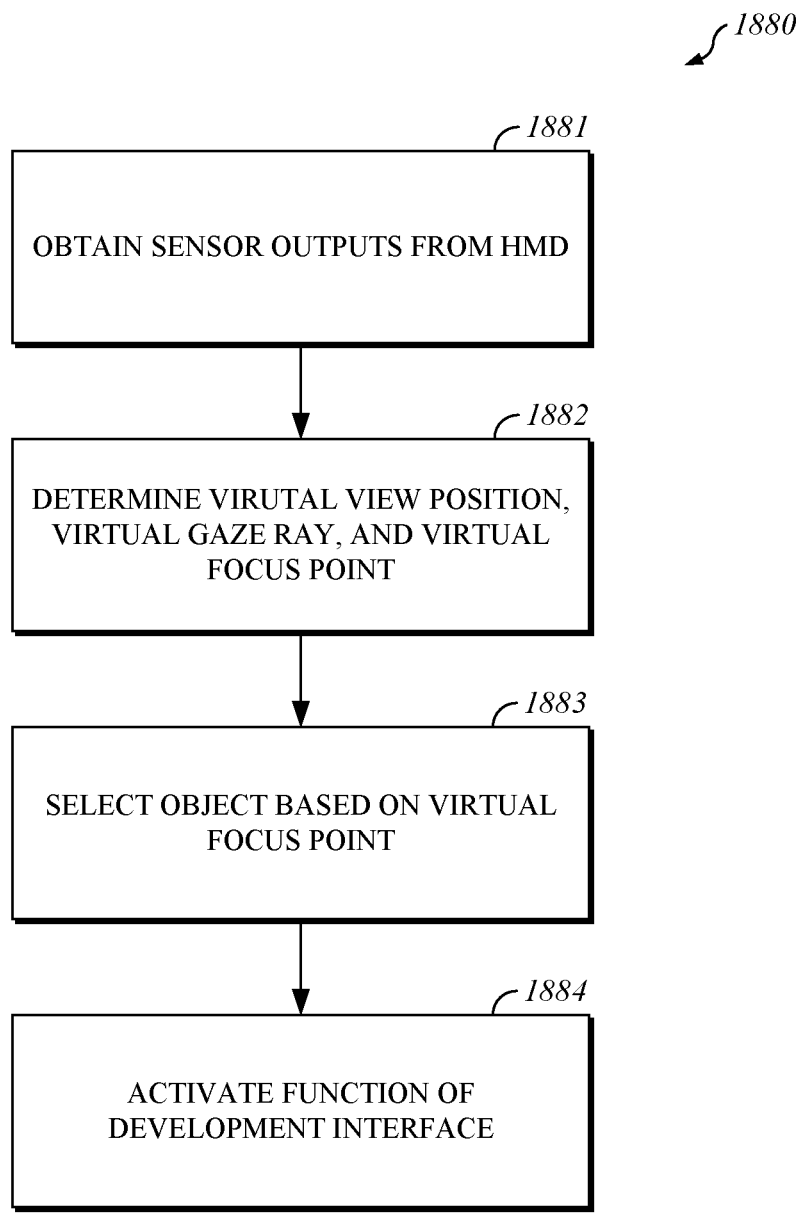
FIG. 18 is a flowchart that shows a process for focus-based debugging and inspection for a head-mounted display system according to a second example.

FIG. 18 is a flowchart that shows a process 1880 for focus-based debugging and inspection for a display system 100. The process 1880 may be performed, for example, using the HMD 102 and the computing device 104. Portions of the process 1880 can be implemented as computer program instructions that are executed by a computing device, such as the processor 340 of the computing device 104.

In operation 1881, sensor outputs are obtained from a head-mounted display, such as the HMD 102. The sensor outputs can include or can be interpreted to determine the head tracking information 108, the eye gaze angle 110, and the eye focus depth 112. In operation 1882, a virtual view position, a virtual gaze ray, and a virtual focus point are determined, as described with respect to the virtual view position 464, the virtual gaze ray 466, and the virtual focus point 468. The virtual view position, the virtual gaze ray, and the virtual focus point are located within a scene in a virtual environment, as described with respect to the virtual environment 116, the scene 460, the scene 760, the scene 960, the scene 1160, the scene 1360, and the scene 1560.

The virtual environment includes an object. In operation 1883, the object is selected in response to determining that the virtual focus point is located within a threshold distance from the object.

In operation 1884, a function of a development interface is activated relative to the second object while the first object is in the second rendering mode, as described with respect to, for example, the development interface 114 and the inspector 670. In some implementations, activating the function of the development interface is performed in response to determining that the virtual focus point has been located within the threshold distance from the object for greater than a threshold time period.

Figure 19:
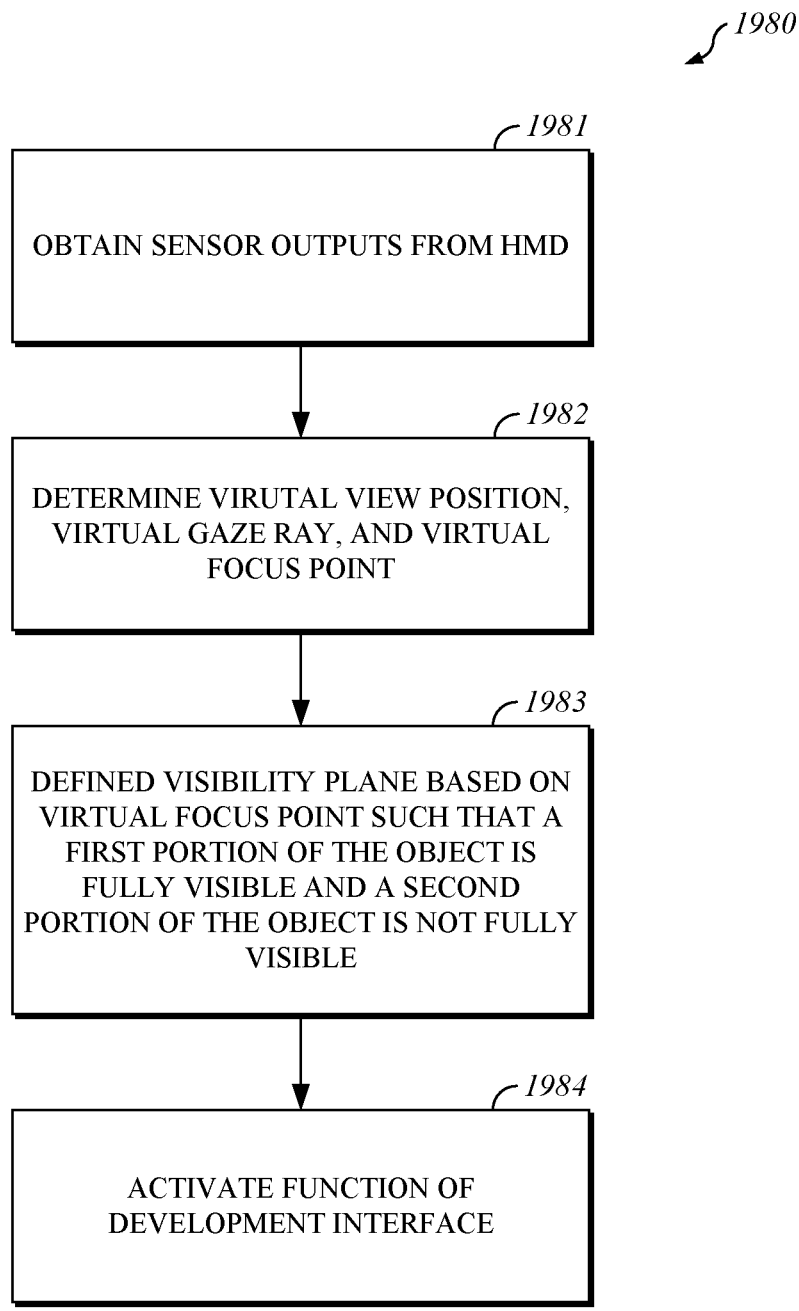
FIG. 19 is a flowchart that shows a process for focus-based debugging and inspection for a head-mounted display system according to a third example.

FIG. 19 is a flowchart that shows a process 1980 for focus-based debugging and inspection for a display system 100. The process 1980 may be performed, for example, using the HMD 102 and the computing device 104. Portions of the process 1980 can be implemented as computer program instructions that are executed by a computing device, such as the processor 340 of the computing device 104.

In operation 1981, sensor outputs are obtained from a head-mounted display, such as the HMD 102. The sensor outputs can include or can be interpreted to determine the head tracking information 108, the eye gaze angle 110, and the eye focus depth 112. In operation 1982, a virtual view position, a virtual gaze ray, and a virtual focus point are determined, as described with respect to the virtual view position 464, the virtual gaze ray 466, and the virtual focus point 468. The virtual view position, the virtual gaze ray, and the virtual focus point are located within a scene in a virtual environment, as described with respect to the virtual environment 116, the scene 460, the scene 760, the scene 960, the scene 1160, the scene 1360, and the scene 1560.

The virtual environment includes an object. In operation 1983, a visibility plane is defined such that it passes through the virtual focus point. A first portion of the object is located on a first side of the visibility plane and is rendered using a first rendering mode in which the first portion of the object is fully visible, and a second portion of the object is located on a second side of the visibility plane and is rendered using a second rendering mode in which the second portion of the object is not fully visible.

In operation 1984, a function of a development interface is activated relative to the second object while the first object is in the second rendering mode, as described with respect to, for example, the development interface 114 and the inspector 670.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to improve user experiences in computer-generated reality environments. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to allow access to user preferences or customizations in order to enhance the user's experience in the computer-generated reality environment. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, use of a user profile in a system that provides a computer-generated reality environment, the present technology can be configured to allow users to select to "opt in" or "opt out" of participation in the collection of personal information data during registration for services or anytime thereafter. In another example, users can select not to use a user profile or limit the amount of time that information is stored in a user profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user experiences in computer-generated environments can be customized by inferring preferences based on non-personal information data or a bare minimum amount of personal information, such as the content being requested by the device associated with a user, other non-personal information available to the services, or publicly available information.

What is claimed is:

1. A method for debugging, comprising:
    determining an eye focus depth for a user;
    determining a virtual focus point relative to a virtual view location in a virtual environment based on the eye focus depth for the user, wherein the virtual environment includes a first object and a second object;
    transitioning the first object from a first rendering mode to a second rendering mode based on a location of the virtual focus point relative to the first object, wherein visibility of the second object from the virtual view location is occluded by the first object in the first rendering mode and visibility of the second object from the virtual view location is not occluded by the first object in the second rendering mode; and
    activating a function of a development interface relative to the second object while the first object is in the second rendering mode.

2. The method of claim 1, wherein the eye focus depth is determined using output from a sensor that is associated with a head-mounted display.

3. The method of claim 1, wherein the virtual focus point is located along a virtual gaze ray determined based on an eye gaze angle and head tracking information.

4. The method of claim 3, wherein the first object is located along the virtual gaze ray.

5. The method of claim 1, wherein transitioning the first object from the first rendering mode to the second rendering mode is performed in response to determining that the virtual focus point is located on a far side of the first object relative to the virtual view location.

6. The method of claim 1, wherein the first rendering mode utilizes rendering settings that are associated with the first object.

7. The method of claim 1, wherein the first object is not visible in the second rendering mode.

8. The method of claim 1, wherein the first object is translucent in the second rendering mode.

9. The method of claim 1, wherein the first object is rendered as a wireframe in the second rendering mode.

10. The method of claim 1, wherein activating the function of the development interface causes display of information associated with the second object.

11. The method of claim 1, wherein activating the function of the development interface causes modification of information associated with the second object.

12. The method of claim 1, wherein activating the function of the development interface further causes a pause of code execution that is associated with the second object.

13. A non-transitory computer-readable storage device including program instructions executable by one or more processors that, when executed, cause the one or more processors to perform operations, the operations comprising:
    determining an eye focus depth for a user;
    determining a virtual focus point relative to a virtual view location in a virtual environment based on the eye focus depth for the user, wherein the virtual environment includes a first object and a second object;
    transitioning the first object from a first rendering mode to a second rendering mode based on a location of the virtual focus point relative to the first object, wherein visibility of the second object from the virtual view location is occluded by the first object in the first rendering mode and visibility of the second object from the virtual view location is not occluded by the first object in the second rendering mode; and activating a function of a development interface relative to the second object while the first object is in the second rendering mode.

14. The non-transitory computer-readable storage device of claim 13, wherein the eye focus depth is determined using output from a sensor that is associated with a head-mounted display.

15. The non-transitory computer-readable storage device of claim 13, wherein the virtual focus point is located along a virtual gaze ray determined based on an eye gaze angle and head tracking information.

16. The non-transitory computer-readable storage device of claim 15, wherein the first object is located along the virtual gaze ray.

17. The non-transitory computer-readable storage device of claim 13, wherein transitioning the first object from the first rendering mode to the second rendering mode is performed in response to determining that the virtual focus point is located on a far side of the first object relative to the virtual view location.

18. The non-transitory computer-readable storage device of claim 13, wherein the first rendering mode utilizes rendering settings that are associated with the first object and the first object is at least one of not visible, translucent, or rendered as a wireframe in the second rendering mode.

19. The non-transitory computer-readable storage device of claim 13, wherein activating the function of the development interface causes at least one of display of information associated with the second object, modification of information associated with the second object, or a pause of code execution that is associated with the second object.

20. A system, comprising:
a memory; and
a processor configured to execute instructions stored in the memory to:
determine an eye focus depth for a user;
determine a virtual focus point relative to a virtual view location in a virtual environment based on the eye focus depth for the user, wherein the virtual environment includes a first object and a second object;
transition the first object from a first rendering mode to a second rendering mode based on a location of the virtual focus point relative to the first object, wherein visibility of the second object from the virtual view location is occluded by the first object in the first rendering mode and visibility of the second object from the virtual view location is not occluded by the first object in the second rendering mode; and
activate a function of a development interface relative to the second object while the first object is in the second rendering mode.

21. The system of claim 20, wherein the eye focus depth is determined using output from a sensor that is associated with a head-mounted display.

22. The system of claim 20, wherein the virtual focus point is located along a virtual gaze ray determined based on an eye gaze angle and head tracking information.

23. The system of claim 22, wherein the first object is located along the virtual gaze ray.

24. The system of claim 20, wherein the first object is transitioned from the first rendering mode to the second rendering mode in response to determining that the virtual focus point is located on a far side of the first object relative to the virtual view location.

25. The system of claim 20, wherein the first rendering mode utilizes rendering settings that are associated with the first object and the first object is at least one of not visible, translucent, or rendered as a wireframe in the second rendering mode.

26. The system of claim 20, wherein the function of the development interface, when activated, causes at least one of display of information associated with the second object, modification of information associated with the second object, or a pause of code execution that is associated with the second object.

* * * * *